(12) United States Patent
Nakatani et al.

(10) Patent No.: US 7,719,953 B2
(45) Date of Patent: May 18, 2010

(54) OPTICAL RECORDING MEDIUM, OPTICAL RECORDING METHOD, OPTICAL REPRODUCING METHOD, OPTICAL RECORDING APPARATUS, AND OPTICAL REPRODUCING APPARATUS

(75) Inventors: Morio Nakatani, Shijonawate (JP); Satoshi Sumi, Gifu (JP); Masahiro Nakata, Ohgaki (JP)

(73) Assignee: Sanyo Electric Co., Ltd., Osaka (JP)

( * ) Notice: Subject to any disclaimer, the term of this patent is extended or adjusted under 35 U.S.C. 154(b) by 1285 days.

(21) Appl. No.: 11/218,788

(22) Filed: Sep. 6, 2005

(65) Prior Publication Data

US 2006/0083154 A1 Apr. 20, 2006

(30) Foreign Application Priority Data

Oct. 19, 2004 (JP) ............................. 2004-304488

(51) Int. Cl.
G11B 7/24 (2006.01)
G11B 3/70 (2006.01)
G11B 5/84 (2006.01)
G11B 7/26 (2006.01)

(52) U.S. Cl. .............. 369/275.4; 369/275.1; 369/275.2; 369/275.3; 369/283

(58) Field of Classification Search ................ 428/64.1, 428/64.2, 64.4; 430/320, 321, 270.1, 270.13; 730/718; 369/275.2, 275.3, 275.1

See application file for complete search history.

(56) References Cited

U.S. PATENT DOCUMENTS 5,156,941 A * 10/1992 Fujita et al. .............. 430/271.1
2001/0007548 A1 * 7/2001 Toda et al. ................ 369/53.27

(Continued)

FOREIGN PATENT DOCUMENTS

CN 1404604 3/2003

(Continued)

OTHER PUBLICATIONS

First Chinese Office Action, with English Translation, issued in Chinese Patent Application No. CN 200510114054.1, issued on May 18, 2007.

(Continued)

*Primary Examiner*—Joseph H Feild
*Assistant Examiner*—Nicholas Lee
(74) *Attorney, Agent, or Firm*—McDermott Will & Emery LLP (57) ABSTRACT

A substrate in which a minute ruggedness structure including columnar projections is formed in a track shape is prepared. The pitch of the columnar projections of the ruggedness structure is set such that a plurality of the columnar projections is within a beam spot. A flat portion is disposed between adjacent tracks. A reflecting layer is formed on the substrate. The flat portion becomes a mirror surface because of the formation of the reflecting layer. The reflectance of the ruggedness structure becomes significantly lower than the reflectance of the flat portion. When the ruggedness structure is irradiated with high-power laser light, a portion of the ruggedness structure is raised to a reflecting layer side and flattened. At this time, reflectance of the raised portion becomes higher than reflectance of a non-raised portion. When a track including the ruggedness structure is irradiated with high-power pulse laser light, signal recording based on a change in reflectance is possible.

16 Claims, 11 Drawing Sheets

U.S. PATENT DOCUMENTS

2002/0136927 A1* 9/2002 Hieda et al. ............... 428/694 T
2002/0145967 A1* 10/2002 Fujii et al. ................ 369/275.4
2003/0053405 A1* 3/2003 Kondo ..................... 369/275.4
2004/0228256 A1* 11/2004 Ueyama et al. ......... 369/110.04

FOREIGN PATENT DOCUMENTS

| CN | 1404604 A | | 3/2003 |
|----|-----------|---|--------|
| JP | 05-197966 | | 8/1993 |
| JP | 06-274941 | | 9/1994 |
| JP | 06274941 A | * | 9/1994 |
| JP | 2003-109247 A | | 4/2003 |

OTHER PUBLICATIONS

Second Chinese Office Action, with English Translation, issued in Chinese Patent Application No. CN 200510114054.1, issued on Oct. 19, 2007.

Japanese Notification of Reasons for Refusal, with English translation thereof, issued in Patent Application No. JP 2004-304488 dated on Jul. 8, 2008.

Chinese Office Action, w/ English translation thereof, issued in Patent Application No. CN 200510114054.1 dated on Feb. 22, 2008.

The full picture of "Blu-ray Disc" the next generation optical disc standard, Mar. 11, 2002, Nikkei Electronics, 79-80, w/ English explanation therof.

Japanese Notification of Reasons for Refusal, w/ English translation thereof, issued in Japanese Patent Application No. JP 2004-304488 dated Aug. 18, 2009.

* cited by examiner

PORTION IRRADIATED WITH LASER LIGHT IS RAISED AND FLATTENED

Fig. 4A

IRRADIATED WITH PULSE LASER LIGHT

Fig.5B

SECTIONAL SHAPE OF RAISED PORTION

Fig.5A

ENLARGED VIEW SHOWING RAISED PORTION

OPTICAL RECORDING MEDIUM, OPTICAL RECORDING METHOD, OPTICAL REPRODUCING METHOD, OPTICAL RECORDING APPARATUS, AND OPTICAL REPRODUCING APPARATUS

BACKGROUND OF THE INVENTION

1. Field of the Invention

The present invention relates to an optical recording medium, an optical recording method, an optical reproducing method, an optical recording apparatus, and an optical reproducing apparatus. More particularly, the present invention is suitable for use in the case where information is recorded and reproduced based on a change in reflectance.

2. Description of the Related Art

Up to now, optical recording media such as a compact disc (CD) and a compact disc-recordable (CD-R) have been developed and commercialized. Of the optical recording media, the CD is a reproduction-only optical disc on which a pit train is spirally formed. Information is read out from the CD based on a change in intensity of reflection light when a pit is irradiated with laser light. The CD-R is a recordable optical disc in which organic pigment is used as a material of the recording layer. A groove is spirally formed on the disc surface of the CD-R. The groove is irradiated with high-power laser light to deform or alter a part of the recording layer, thereby recording information therein. In addition to the optical recording media, a digital versatile disc (DVD) using red laser light as laser light for recording and reproducing has been commercialized. Further, the standardization of a next-generation DVD using blue laser light as laser light for recording and reproducing proceeds and the next-generation DVD are being commercialized.

In the reproduction-only optical disc among the above-mentioned optical discs, a pit train having a length corresponding to a recording signal is formed in a track shape. In the recordable optical disc, the recording layer is deformed or altered to form a pit train having a length corresponding to a recording signal on the groove. In either type of the optical discs, a single mark is formed from a single pit.

SUMMARY OF THE INVENTION

An object of the present invention is to propose a novel recording method alternative to conventional recording methods.

In a reproduction-only optical disc according to the present invention, a single recording mark is not formed from a single pit. In a recordable optical disc according to the present invention, data can be recorded without providing any separate recording layer. Another object of the present invention is to propose a novel method and a novel apparatus for recording and reproducing information in and from the recordable optical disc.

According to a first aspect of the present invention, there is provided an optical recording medium characterized by including: a substrate in which a ruggedness structure having a pitch smaller than a wavelength of laser light used for recording and/or reproducing is formed in a surface thereof; and a reflecting layer formed on the surface of the substrate in which the ruggedness structure is formed.

According to a second aspect of the present invention, there is provided an optical recording method of irradiating an optical recording medium with laser light to record information in the optical recording medium, the optical recording medium including: a substrate in which a ruggedness structure having a pitch smaller than a wavelength of the laser light is formed in a surface thereof; and a reflecting layer formed on the surface of the substrate in which the ruggedness structure is formed. The optical recording method is characterized by including: irradiating the optical recording medium with the laser light such that a plurality of projection portions of the ruggedness structure are within a beam spot of the laser light; and setting power of the laser light at a recording mark formation timing to power in which the shape of the ruggedness structure can be changed while the optical recording medium is irradiated with the laser light.

According to a third aspect of the present invention, there is provided an optical reproducing method of irradiating an optical recording medium with laser light to reproduce information from the optical recording medium, the optical recording medium including: a substrate in which a series of ruggedness structures having a pitch smaller than a wavelength of reproducing laser light are intermittently formed in a surface of the substrate along a track; and a reflecting layer formed on the surface of the substrate in which the ruggedness structures are formed.

The optical reproducing method is characterized by including: causing the laser light to follow the track; and irradiating the optical recording medium with the laser light at power in which shapes of the ruggedness structures can not be changed while a plurality of projection portions of the ruggedness structure are within a beam spot of the laser light.

According to a fourth aspect of the present invention, there is provided an optical recording apparatus for irradiating an optical recording medium with laser light to record information in the optical recording medium, the optical recording medium including: a substrate in which a ruggedness structure having a pitch smaller than a wavelength of the laser light is formed in a surface thereof; and a reflecting layer formed on the surface of the substrate in which the ruggedness structure is formed.

The optical recording apparatus is characterized by including: laser irradiation means for condensing the laser light and irradiating the optical recording medium with the laser light such that a plurality of projection portions of the ruggedness structure is within a beam spot of the laser light; and power setting means for setting power of the laser light at a recording mark formation timing to power by which the shape of the ruggedness structure can be changed while the optical recording medium is irradiated with the laser light.

According to a fifth aspect of the present invention, there is provided an optical reproducing apparatus for irradiating an optical recording medium with laser light to reproduce information from the optical recording medium, the optical recording medium including: a substrate in which a series of ruggedness structures having a pitch smaller than a wavelength of the laser light are intermittently formed in a surface of the substrate along a track; and a reflecting layer formed on the surface of the substrate in which the ruggedness structures are formed. The optical reproducing apparatus is characterized by including: laser irradiation means for condensing the laser light and irradiating the optical recording medium with the laser light such that a plurality of projection portions of the ruggedness structure are within a beam spot of the laser light while the laser light follows the track; and power setting means for setting power of the laser light to power by which shapes of the ruggedness structures can not be changed while the optical recording medium is irradiated with the laser light.

According to the present invention, it is possible to provide a novel type of optical recording medium using a minute ruggedness structure. When the present invention is applied to the recordable optical disc, a recording layer to be located can be omitted. Therefore, the disc structure and the manufacturing process for the disc can be simplified. It is unnecessary to use an organic pigment material as a material of the recording layer unlike the case of known CD-Rs. Therefore, it is possible to avoid the adverse effects on environment.

BRIEF DESCRIPTION OF THE DRAWINGS

The above-mentioned and other objects of the present invention and the novel features thereof will be more completely apparent when the following descriptions of an embodiment mode are read with reference to the accompanying drawings in which.

DESCRIPTION OF THE PREFERRED EMBODIMENT

Hereinafter, an embodiment mode of the present invention will be described with reference to the accompanying drawings. Note that the present invention is not limited to the following embodiment mode.

Figure 1:
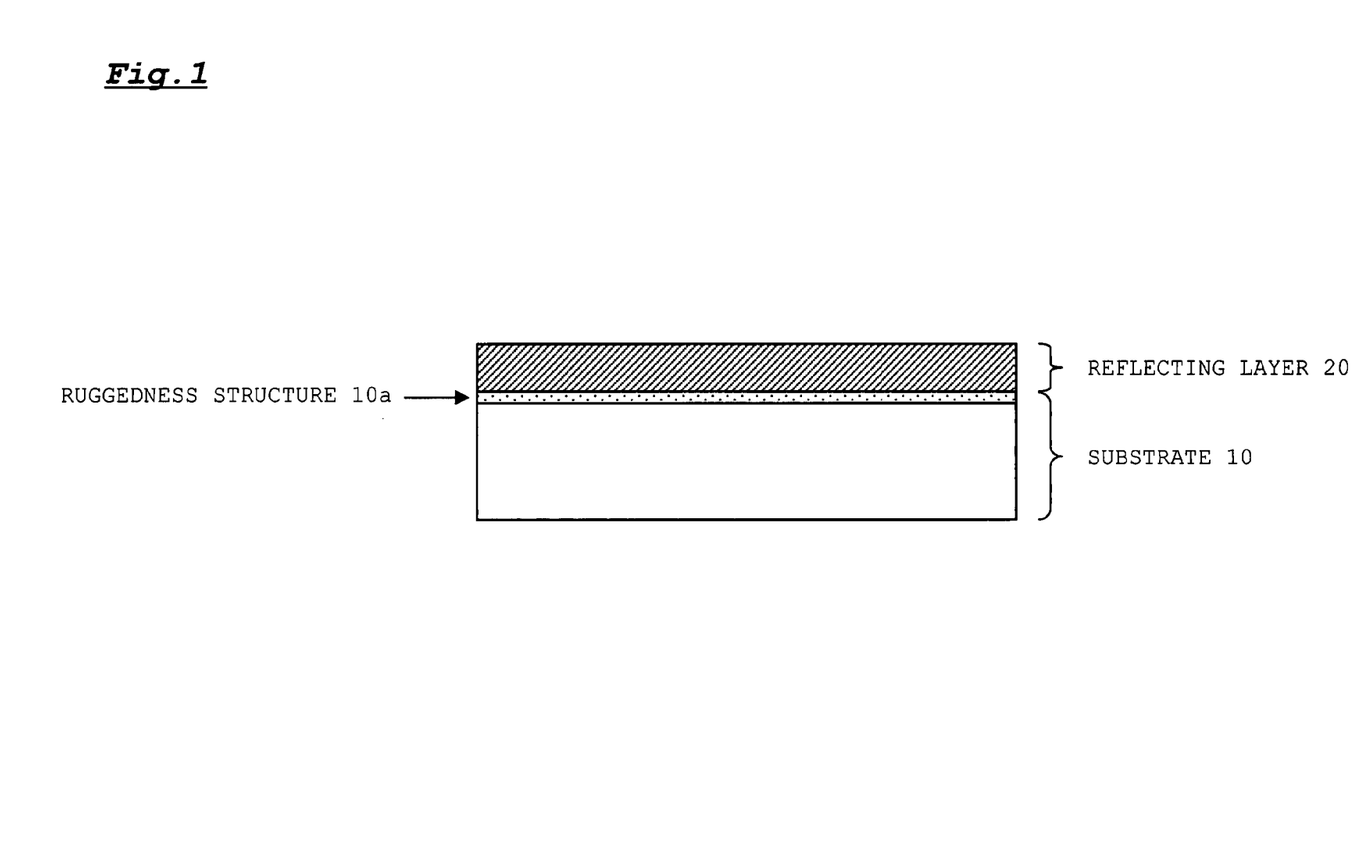
FIG. 1 is a sectional view showing a fundamental structure of an optical recording medium according to an embodiment mode of the present invention.

FIG. 1 illustrates a fundamental structure of an optical recording medium.

The optical recording medium includes a substrate 10 and a reflecting layer 20 formed thereon. The substrate 10 is typically made of a translucent material such as polycarbonate. The reflecting layer 20 is made of a high-reflection material such as Al. The high-reflection material is used to form a film on the substrate 10 by sputtering or the like.

A minute ruggedness structure 10a is provided in the surface of the substrate 10 on which the reflecting layer is formed. When the reflecting layer 20 is provided on the ruggedness structure 10a as described above, the ruggedness structure 10a of the substrate 10 is reflected on the surface of the reflecting layer 20.

The ruggedness structure 10a is set to a size required to simultaneously irradiate a plurality of projection portions of the ruggedness structure with a beam spot of laser light for recording and reproducing. In such a case, only when a pitch of the ruggedness structure 10a in an in-plane direction is set to be smaller than a wavelength of laser light for recording and reproducing, the plurality of projection portions can be simultaneously irradiated with the beam spot of the reproducing laser light.

Measurement Example 1

The optical recording medium having the above-mentioned structure was actually prepared for reflectance measurement. Hereinafter, this will be described.

Figure 2A:
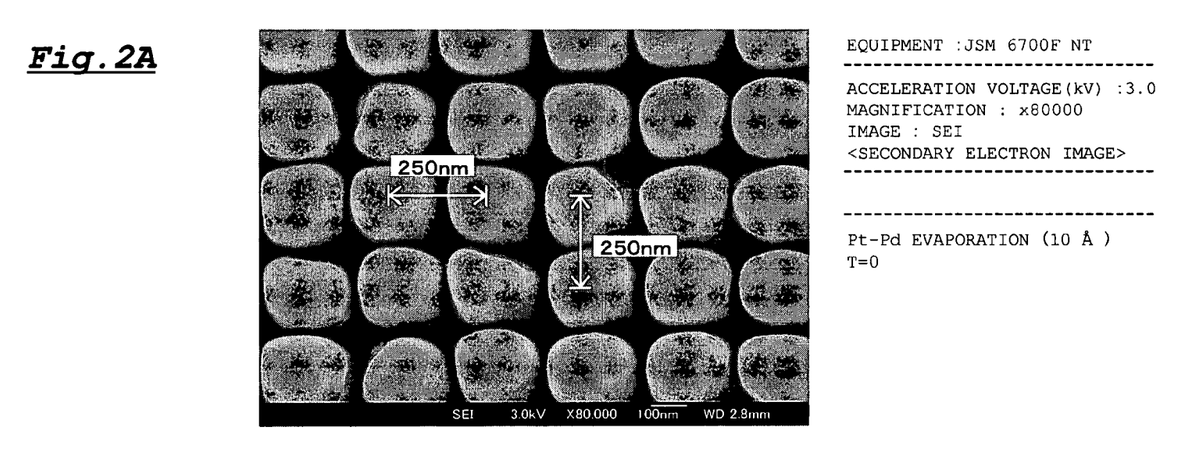
FIGS. 2A and 2B are photographs showing an electron image of a ruggedness structure in Measurement Example 1.
Figure 2B:
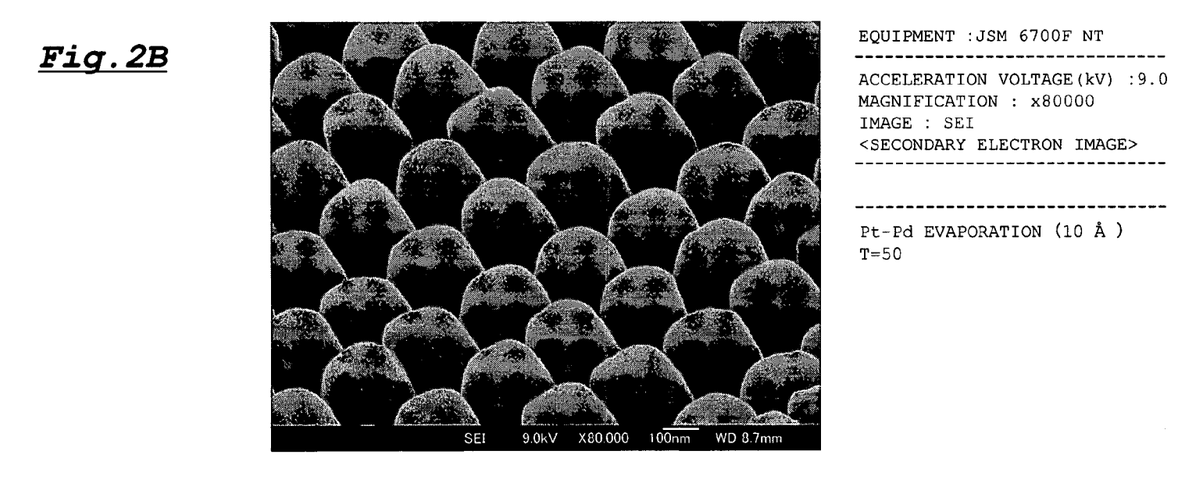

FIGS. 2A and 2B each show a secondary electron image of the ruggedness structure 10a formed in the substrate 10. FIG. 2A shows a secondary electron image obtained when the ruggedness structure 10a was imaged from the upper surface side. FIG. 2B illustrates a secondary electron image obtained when the ruggedness structure 10a was imaged from the oblique upper surface side. Note that FIGS. 2A and 2B show the secondary electron images obtained when electrophotographic imaging was performed with a state in which an alloy film of 50 atomic % Co and 50 atomic % Al was formed at a thickness of 20 nm on the ruggedness structure 10a by sputtering and a Pt—Pd film having a thickness of 10 angstroms was then formed thereon by evaporation.

As shown in FIGS. 2A and 2B, in this measurement, the ruggedness structure 10a, in which columnar projections were uniformly arranged at regular pitches in longitudinal and lateral directions, was formed. Each of the pitches (distance between adjacent columnar projections) of the ruggedness structure 10a in the longitudinal and lateral directions was 250 nm. The height of each of the columnar projections was 170 nm.

The substrate 10 shown in each of FIGS. 2A and 2b was formed as follows.

First, a resist was applied to a silicon base by spin coating. The resist used here was a resist for electron beam. It is possible to use NEB22 manufactured by Sumitomo Chemical Company, Limited, for instance. After that, a ruggedness structure was formed at a pitch the above by EB drawing (electron beam cutting). After the drawing, development was performed for RIE processing. Then, oxygen plasma ashing was conducted to remove any remaining resist. Therefore, the ruggedness structure was formed in the silicon base (Si master).

Next, Ni sputtering was performed on the Si master and a Ni layer was deposited by electrolytic plating. Then, the deposited Ni layer was removed from the Si master and a stamper was produced. Injection molding using the stamper was performed to produce the substrate 10. Therefore, the substrate 10 to which the ruggedness structure was transferred was formed.

For example, an injection molding machine (M-35B-D-DM) produced by Meiki Co., Ltd. can be used for injection molding. A translucent material such as polycarbonate or polyolefin can be used as a substrate material. Polycarbonate was used in this measurement. In addition to the translucent material, a biodegradable material can also be used as the substrate material. In this case, for example, environmental burdens at the time of disposal can be reduced.

It is also possible to use laser beam cutting instead of the EB drawing. In this case, a photoresist layer is applied onto the silicon base. Laser light having a wavelength of about 400 nm is used as a cutting beam.

In this measurement, the alloy film (reflecting film) of 50 atomic % Co and 50 atomic % Al was formed at a thickness of 20 nm on the substrate 10 produced as described above by sputtering. In the case of the optical recording medium used for the measurement, only the alloy film (reflecting film) was formed on the substrate 10. The formation of the reflecting film was performed as follows.

A vacuum chamber was evacuated up to 5×10–5 Pa. Then, an Ar gas was introduced thereto. Sputtering was performed in an atmosphere of 0.6 Pa. A Co target and an Al target were set in the vacuum chamber and the alloy film (reflecting film) of 50 atomic % Co and 50 atomic % Al was formed using a co-sputtering method of simultaneously supplying power to each of the targets to carry out alloying. In order to uniformly form the reflecting film, the substrate 10 was revolved at 40 rpm during discharging.

Figure 3:
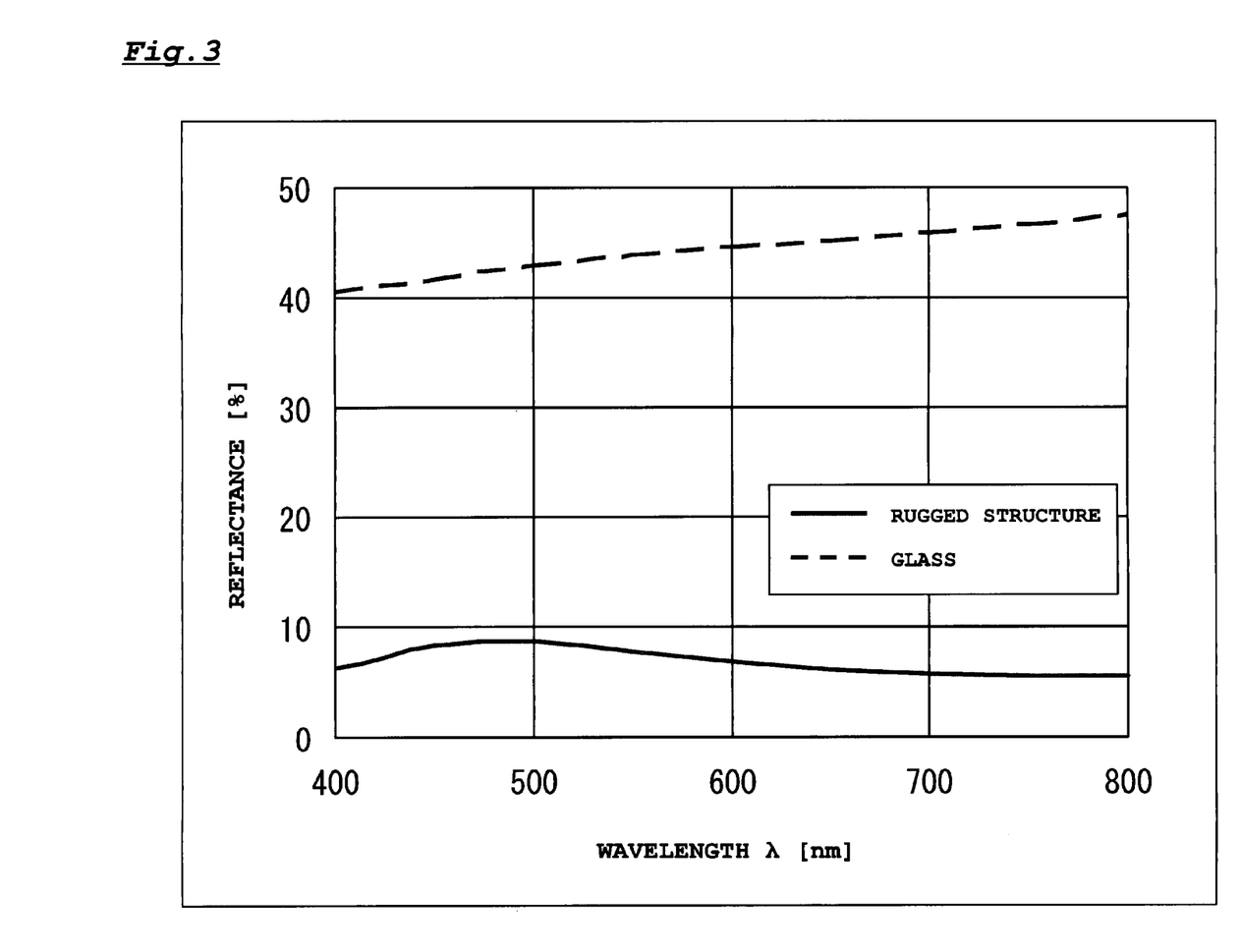
FIG. 3 is a graph showing a result obtained by measurement of reflectance in Measurement Example 1.

After the optical recording medium was produced as described above, the reflectance thereof was measured. FIG. 3 illustrates a result obtained by the measurement. FIG. 3 also illustrates a comparative example related to a result of reflectance obtained by measurement on an optical recording medium in which the alloy film of 50 atomic % Co and 50 atomic % Al was formed by sputtering at a thickness of 20 nm on a glass substrate having a flat reflecting film forming surface.

As is apparent from FIG. 3, when the above-mentioned ruggedness structure 10a is formed in the substrate 10, the reflectance of the substrate 10 is reduced by about 35% to 40% as compared with that of a substrate on which a flat Al—Co film is formed. Therefore, when the ruggedness structure 10a is formed, it is apparent that a larger reflectance difference with a mirror surface portion in which the ruggedness structure 10a is not formed can be provided.

When the ruggedness structure 10a is formed in a recording mark portion for signal recording based on a change in reflectance, an S/N (Signal to Noise ration) of a reproduction signal can be significantly improved. When the ruggedness structure 10a is formed in a signal track portion, the reflectance difference with a mirror surface portion between adjacent tracks becomes larger. Therefore, a tracking error signal can be preferably generated. That is, a recording track can be formed without forming any groove.

Measurement Example 2

The optical recording medium in which the ruggedness structure 10a was formed in the substrate 10 was subjected to spot irradiation with a high-power laser beam. Then, a change in shape of the ruggedness structure 10a and a variation in reflectance thereof were measured. Hereinafter, this will be described.

In this measurement, an Al film was formed as the reflecting film. The Al film was formed on a substrate surface in which the ruggedness structure 10a was formed by sputtering. A film thickness of the Al film was set to 20 nm. In the formation of the Al film, only the Al target was set in the chamber unlike Measurement Example 1 (the Al—Co film was formed). Others were identical to those in Measurement Example 1. A shape of the ruggedness structure 10a and a size thereof were identical those in Measurement Example 1.

The optical recording medium was irradiated from the reflecting film side with a converged pulse beam having a wavelength of 635 nm and power of 10 mW. A beam spot was converged to a spot diameter of about 1 μm by an objective lens (NA=0.55). A regular pulse frequency of the irradiating beam was maintained.

Figure 4A:
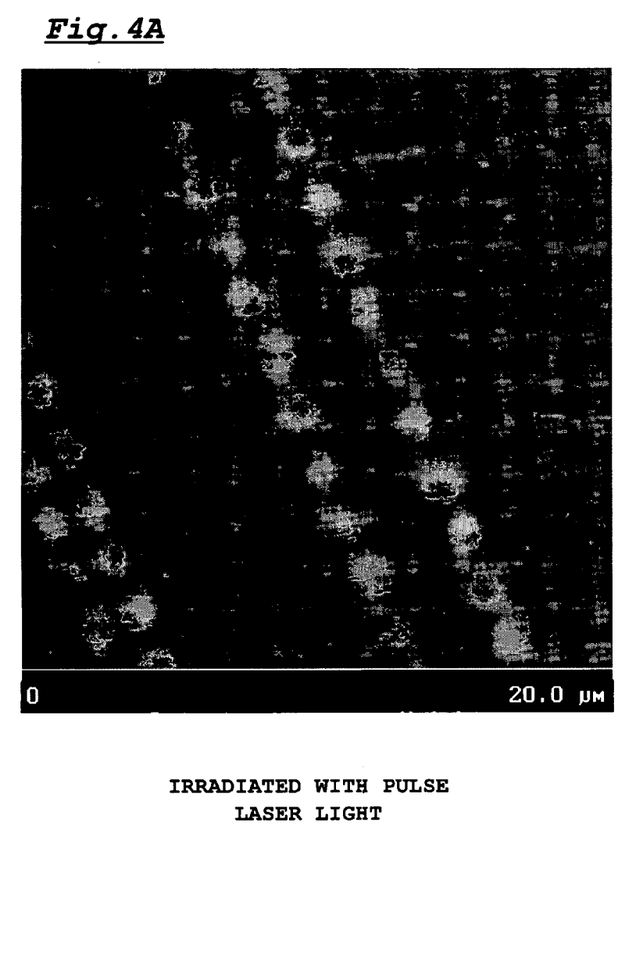
FIGS. 4A and 4B are photographs showing an electron image of a substrate shape in Measurement Example 2.
Figure 4B:
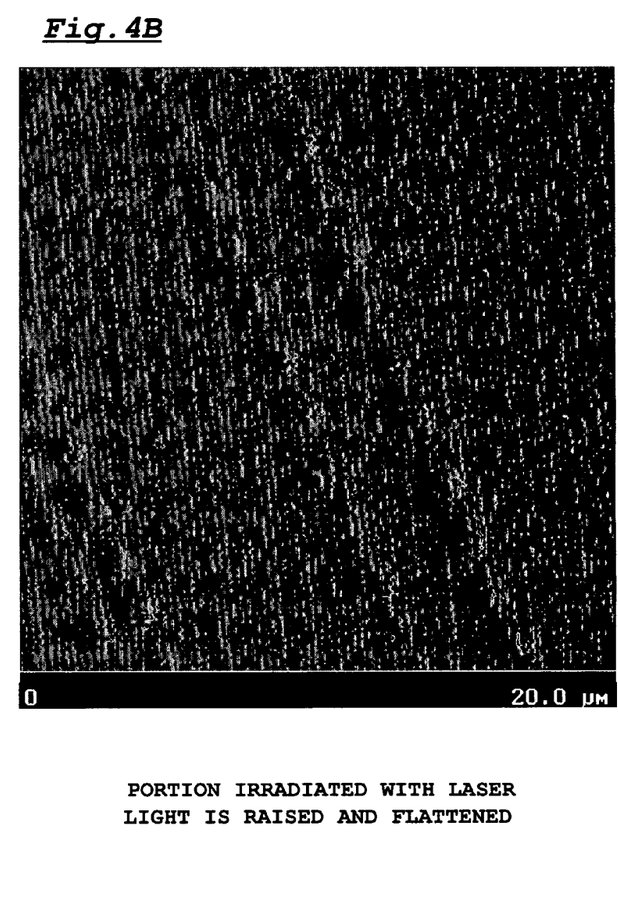

FIG. 4A shows the scanning locus of the pulse beam. In FIG. 4A, each of white portions indicates an irradiation positron of the pulse beam. FIG. 4B shows a shape of the substrate surface after the irradiation with the pulse beam. As is apparent from FIG. 4B, the substrate surface portion irradiated with the pulse beam is raised comparing to other portions.

Figure 5A:
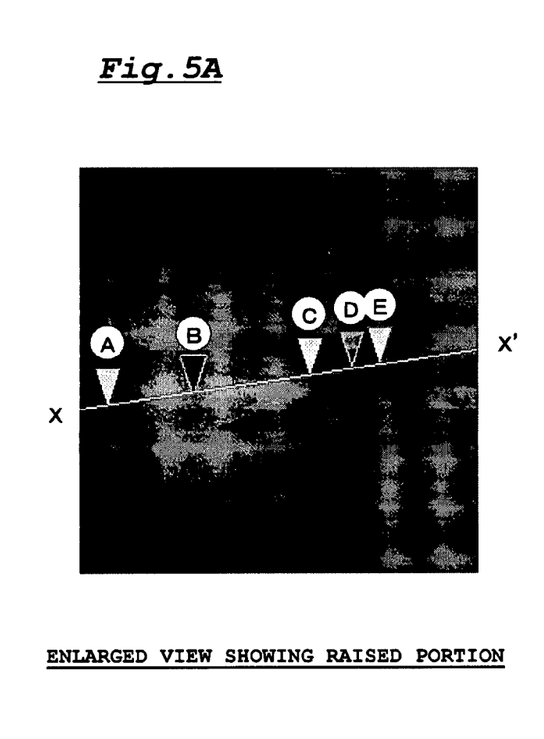
FIG. 5A is an enlarged view showing a raised portion in Measurement Example 2 and FIG. 5B is a graph showing a result obtained by measurement of a sectional shape of the raised portion in Measurement Example 2.
Figure 5B:
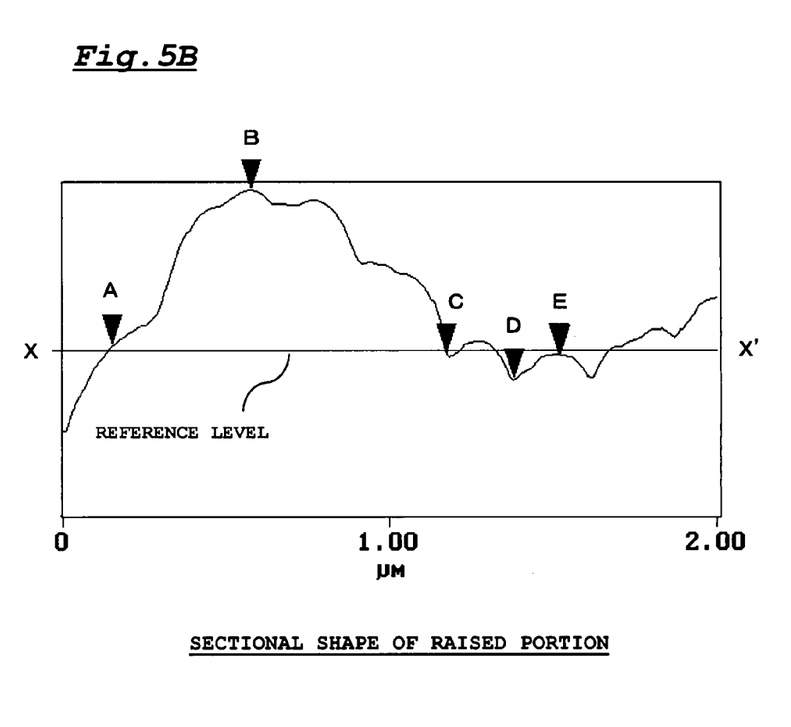

FIG. 5A is an enlarged view showing the raised portion. FIG. 5B is a graph showing a result obtained by measurement of a sectional shape of the raised portion along the X-X' line in FIG. 5A. As is apparent from the measurement result, the substrate surface portion irradiated with the pulse beam is significantly raised comparing to other portions and an upper surface part of the substrate surface portion thus irradiated is flattened.

The portion which has been already scanned with the pulse beam was scanned with low-power monotonic laser light. Then, a change in intensity of reflection light was measured using an oscilloscope. As a result, the reflection light intensity of a frequency component of the pulse beam was higher than that of another frequency component by about 10% to 20%. As is apparent from the result obtained by the measurement, the reflectance of the raised portion becomes higher than that of a non-raised portion by about 10% to 20%. Therefore, it is apparent that signal recording based on a change in reflectance is possible by irradiating the ruggedness structure 10a with the high-power laser beam. That is, when the ruggedness structure 10a is formed in a track shape (spiral shape or concentric shape) and subjected to pulse irradiation with the high-power laser light, the signal recording based on the change in reflectance is possible.

The reason why the raise of the substrate surface portion is caused by the irradiation with the high-power laser light may be as follows. That is, a temperature of the substrate is increased to the glass transition temperature or more due to an increase in temperature of the substrate surface portion. Then, the substrate surface portion is raised in a raise direction by surface tension of the reflecting film which is produced by the shape of the ruggedness structure 10a.

In the optical recording medium according to this embodiment mode, the ruggedness structure 10a as shown in FIGS. 2A and 2B is formed in the substrate surface, so a surface area subjected to an irradiation with beam becomes larger and it becomes hard to cause thermal diffusion in a medium surface direction. Therefore, heat absorption at a beam irradiation position is high and absorbed heat is likely to gather, so that an increase in temperature is easily caused by the irradiation with the high-power laser light. As a result, a temperature of the substrate surface portion at the beam irradiation position easily reaches the glass transition temperature, resulting in that flow displacement is easily caused by external force. Thus, when external force is applied to the substrate surface portion based on the surface tension of the reflecting film which is produced by the shape of the ruggedness structure 10a, the substrate surface portion may be pulled in an upper direction by the external force to be raised.

Therefore, when the recordable optical disc is produced based on the above-mentioned structure, it is advantageous to use a material having a low glass transition temperature as the substrate material in order to easily cause the flow displacement with an increase in temperature.

In the above-mentioned measurement example, a polycarbonate resin was used as the substrate material. When a material having a glass transition temperature lower than that of polycarbonate is used, recording with lower laser power is possible. Because the glass transition temperature of polycarbonate is 120° C. to 140° C., it is more preferable that an acrylic resin (glass transition temperature is 110° C.), a plant-based plastic made of polylactic acid (glass transition temperature is 60° C. to 100° C.), or the like be used as the substrate material. In particular, when the polylactic acid is used, for example, the depletion of a finite resource can be avoided because no oil asset is used. In addition, even when the substrate material is disposed into the ground or the like, the substrate material is degraded by, for example, microorganisms present in the ground, so the effects on environment at the time of disposal can be reduced compared to the case with an oil-based material.

A material of the reflecting film may be such material that radiated laser light is reflected by a surface of a film made of the material and reflectance of the surface having the ruggedness structure is reduced as compared with reflectance of the mirror surface having no ruggedness structure. More specifically, a combination of Al and other alloys, or the like can be used in addition to Al used in Measurement Example 2. When such kind of material is used, the reflectance of the mirror surface portion having no ruggedness structure at a wavelength of 650 nm becomes 90% or more and the reflectance having the ruggedness structure rapidly reduces to 10%. Therefore, such a material is suitable as a material of the reflecting film for a recordable or reproduction-only recording medium.

It is desirable that the material of the reflecting film be normally present in nature, be not a material hazardous to humans, and be not a substance having no regulations concerning the amount of disposal, material content, and the like at the time of disposal. When such a material is used, the material can be disposed by a simple method such as landfilling and it is unlikely to cause pollution and the like.

Embodiment 1

Hereinafter, a specific structural example in the case where the above-mentioned fundamental structural example is developed to an optical disc will be described. This embodiment relates to the case where the present invention is applied to a recordable optical disc.

Figure 6:
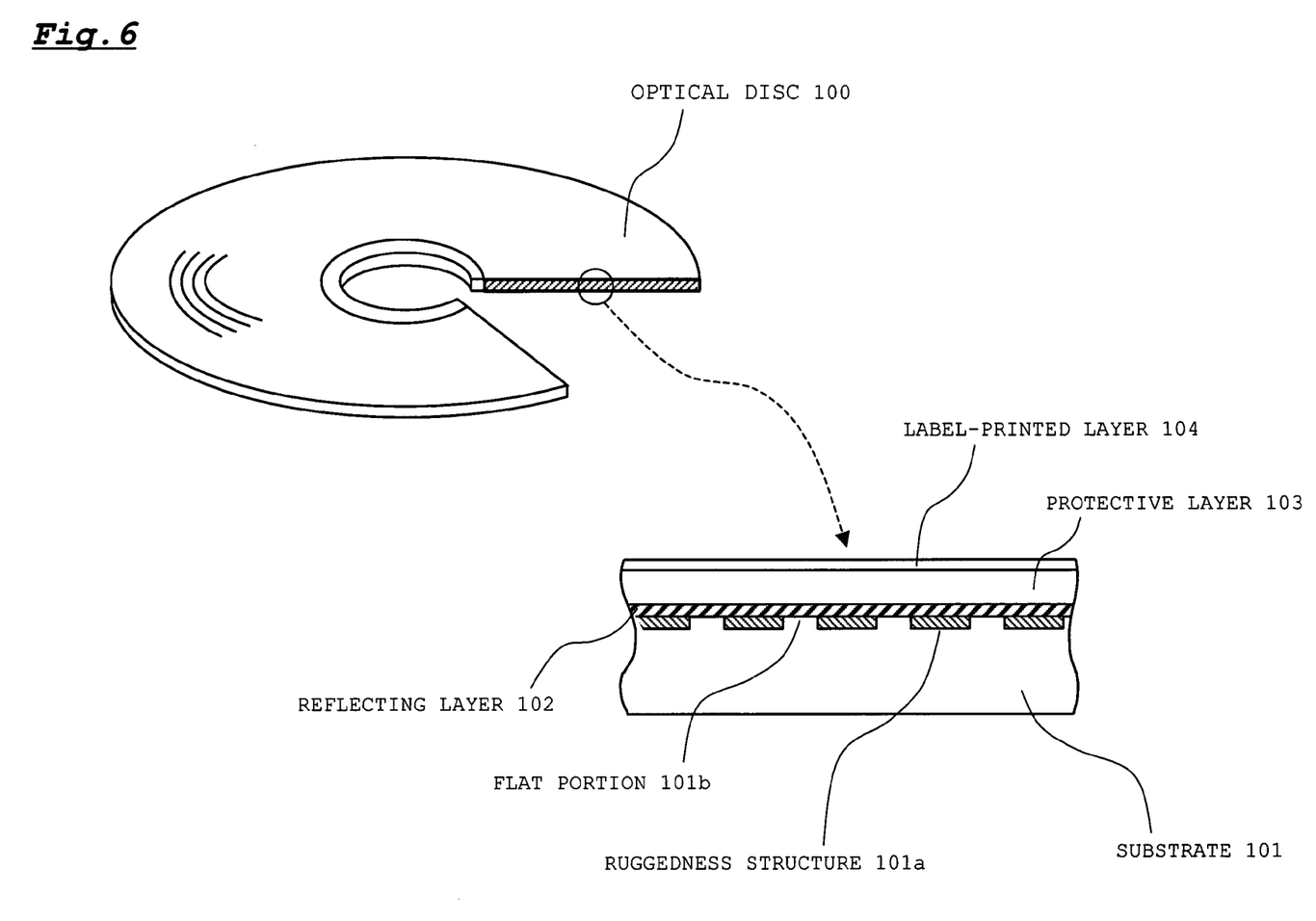
FIG. 6 is a structural view showing an optical disc according to Embodiment 1 of the present invention.

FIG. 6 is a structural view showing the optical disc.

As shown in FIG. 6, an optical disc 100 includes a substrate 101, a reflecting layer 102, a protective layer 103, and a label-printed layer 104.

Figure 7:
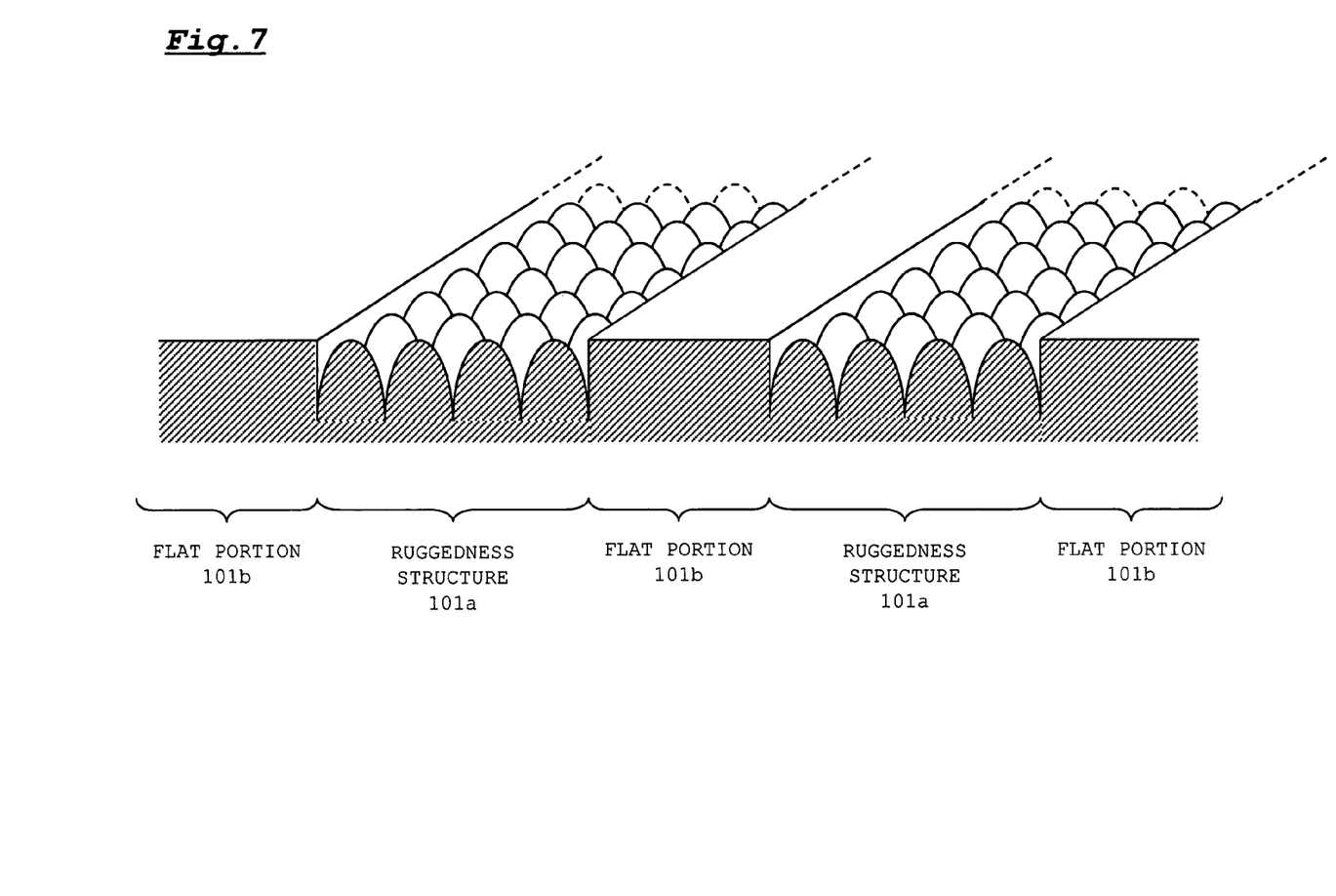
FIG. 7 is a structural (substrate shape) view showing the optical disc according to Embodiment 1 of the present invention.

A ruggedness structure 101*a* as described above is formed as a spiral or concentric track in a surface of the substrate 101 on which the reflecting layer 102 is formed. In this embodiment, as shown in FIG. 7, the ruggedness structure 101*a* includes four columnar structures (columnar projection portions) arranged in a track width direction and a large number of columnar structures arranged in a track length direction. A height of the apex of each of the columnar structures becomes equal to that of a surface of a flat portion 101*b* located between adjacent tracks.

As described above, the substrate 101 is formed by electron beam etching and injection molding.

Figure 8:
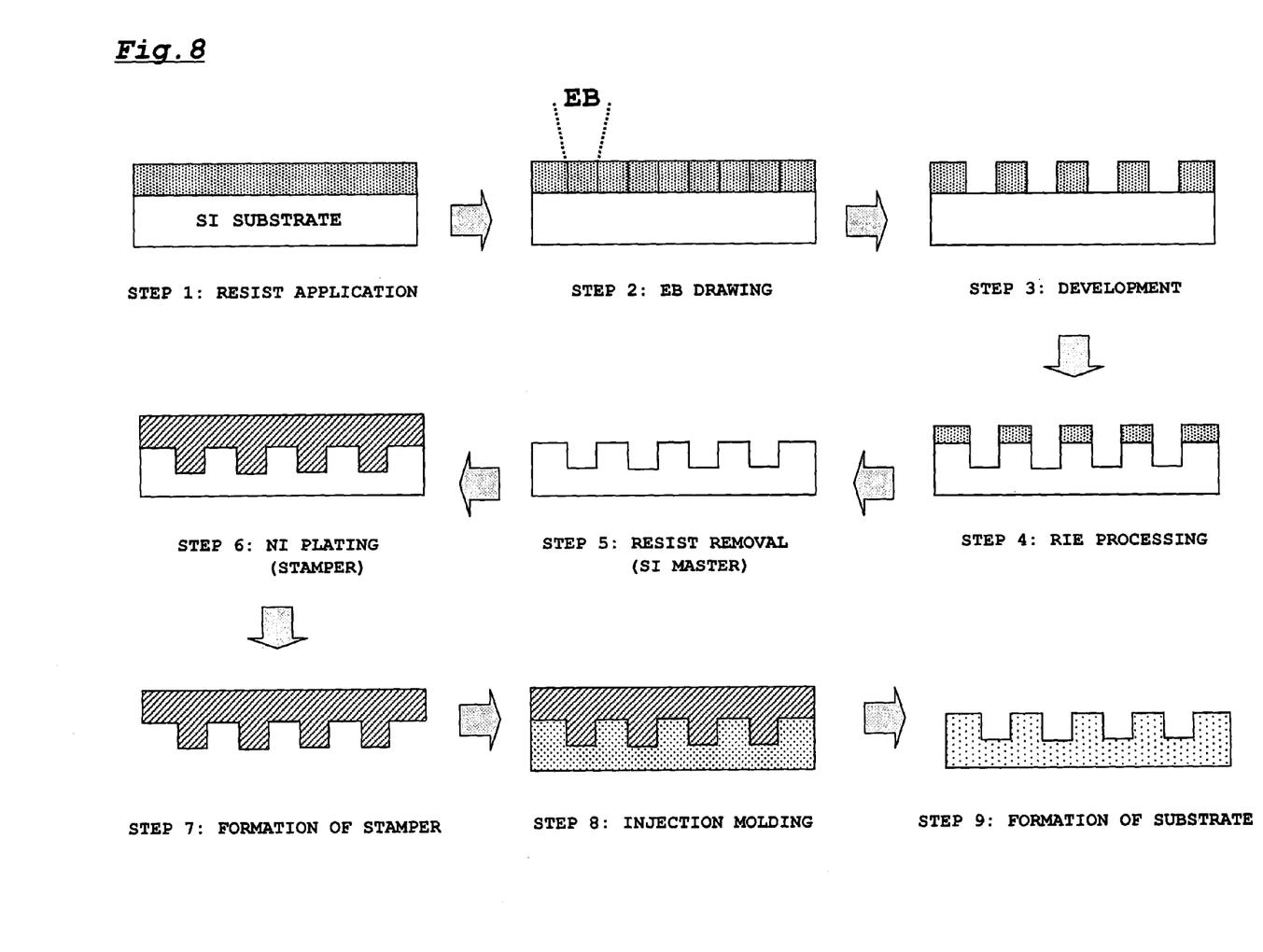
FIG. 8 is a sectional view showing a process for producing a substrate in Embodiment 1 of the present invention.

FIG. 8 is a schematic view showing a process for forming the substrate 101. Referring to FIG. 8, first, a resist to be exposed to an electron beam is applied onto a silicon base (Step 1). Next, exposure is performed on a part corresponding to a groove of the ruggedness structure 101*a* while the silicon base is scanned with the electron beam in x- and y-directions, thereby forming an original of the ruggedness structure 101*a* on the silicon base (Step 2). At this time, a part corresponding to the flat portion 101*b* is not subjected to the exposure using the electron beam. After the exposure on the entire region of the silicon base is completed, development is performed (Step 3). Then, RIE processing is performed to transfer an exposed portion onto the Si base (Step 4). Oxygen plasma ashing is conducted to remove any remaining resist (Step 5). Therefore, the ruggedness structure is formed in the silicon base (Si master).

After that, the Si base is subjected to Ni plating to form a stamper (Steps 6 and 7). Injection transfer using the stamper is performed to produce the substrate for the optical disc (Steps 8 and 9).

The reflecting layer 102 is stacked on the substrate 101 by a sputtering method. Then, in order to prevent the reflecting layer 102 from being damaged or oxidized, an UV curable resin is stacked by spin coating or the like to form the protective layer 103. The label-printed layer 104 is formed on the protective layer 103 by silk screen or the like.

As described above, a polycarbonate resin, an acrylic resin (glass transition temperature is 110° C.), a plant-based plastic made of polylactic acid, or the like is used as the substrate material. Al, a combination of Al and other alloys, or the like can be used as the material of the reflecting layer.

Figure 9A:
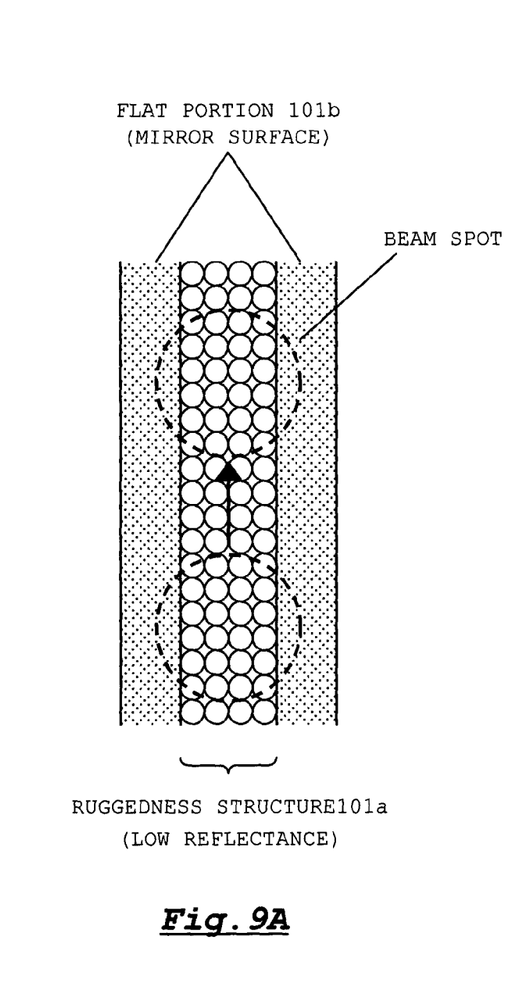
FIGS. 9A to 9C are schematic views showing a state of a track at recording in Embodiment 1 of the present invention.
Figure 9B:
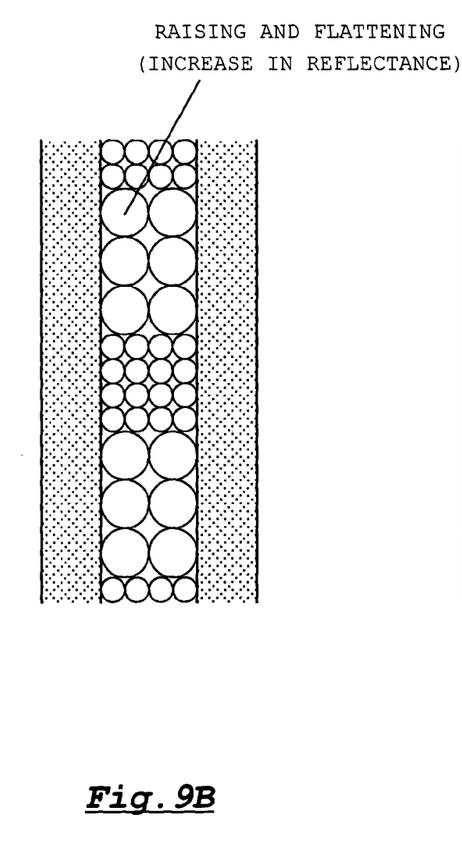
Figure 9C:
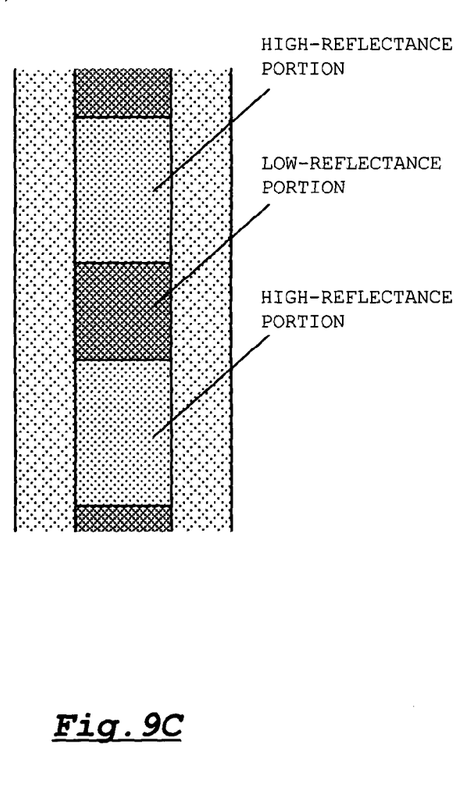

FIGS. 9A to 9C are schematic views each showing a state of a track at the time of recording.

As described above, the ruggedness structure 101*a* is formed in a spiral shape or a concentric shape in the optical disc 100. FIG. 9 illustrates a non-recording state. The flat portion 101*b* between adjacent tracks becomes a mirror surface because of the reflecting layer 102. Each of the tracks becomes a low-reflective surface because of the ruggedness structure 101*a*.

In FIG. 9A, when a track is scanned with laser light whose intensity is modulated in a pulse form such that a plurality of columnar structures of the ruggedness structure are within a beam spot of the laser light, a temperature of a portion irradiated with a high-intensity beam increases. Therefore, as shown in FIG. 9B, the surface of the irradiated portion is raised in a reflecting layer 102 direction. At this time, as described in Measurement Example 2, the surface of the ruggedness structure 101*a* is flattened by being raised. The reflectance of the irradiated portion is increased by the rising and flattening as described in Measurement Example 2. As a result, as shown in FIG. 9C, a series of high-reflectance portions (high-power beam irradiated portion) and a series of low-reflectance portions (high-power beam non-irradiated portion) are formed in the recording track. Therefore, a signal is recorded in the track.

At this time, the flat portion between adjacent tracks becomes a mirror surface. Therefore, for example, the beam spot can be positioned onto the track by servo systems similar to a tracking serve system and a focus servo system which are employed in a known CD-R player.

Embodiment 2

This embodiment relates to the case where the present invention is applied to a reproduction-only optical disc.

The layer structure of the disc is identical to that in Embodiment 1. Note that, in this embodiment, a series of the ruggedness structures 101*a* are formed corresponding to recording signals in a spiral shape or a concentric shape. As in Embodiment 1, the series of the ruggedness structures 101*a* are formed in the substrate 101 by electron beam etching and injection molding. That is, in Step 2 shown in FIG. 8, exposure is performed on parts corresponding to grooves of the ruggedness structures 101*a* while the silicon base is scanned with an electron beam in the x- and y-directions, thereby forming originals of the ruggedness structures 101*a* on the silicon base. At this time, a part corresponding to the flat portion 101*b* between adjacent tracks and a space portion between the ruggedness structures 101*a* in each track are not subjected to the exposure using the electron beam. Other steps are performed as in the steps shown in FIG. 8. The reflecting layer 102, the protective layer 103, and the label-printed layer 104 are formed as in Embodiment 1.

In this embodiment, the optical disc is not a recordable type but a reproduction-only type, so it is possible to use a material having a high glass transition temperature as the substrate material unlike Embodiment 1 described above. Since laser power at time of reproducing is lower than laser power at time of recording, so a polycarbonate resin can be used as the substrate material. When glass (glass transition temperature is 150° C. or higher) or cycloolefin (glass transition temperature is 140° C. to 160° C.) which has a glass transition temperature higher than that of polycarbonate is used, it is possible to further improve the resistance property of the substrate to laser light. When a material having a high glass transition temperature is used as described above, it is also possible to improve the resistance property under an adverse condition such as a state in which the optical disc is left in a car subjected to direct sunlight. As described above, Al, a combination of Al and other alloys, or the like can be used as the material of the reflecting layer.

Figures 10A, 10B:
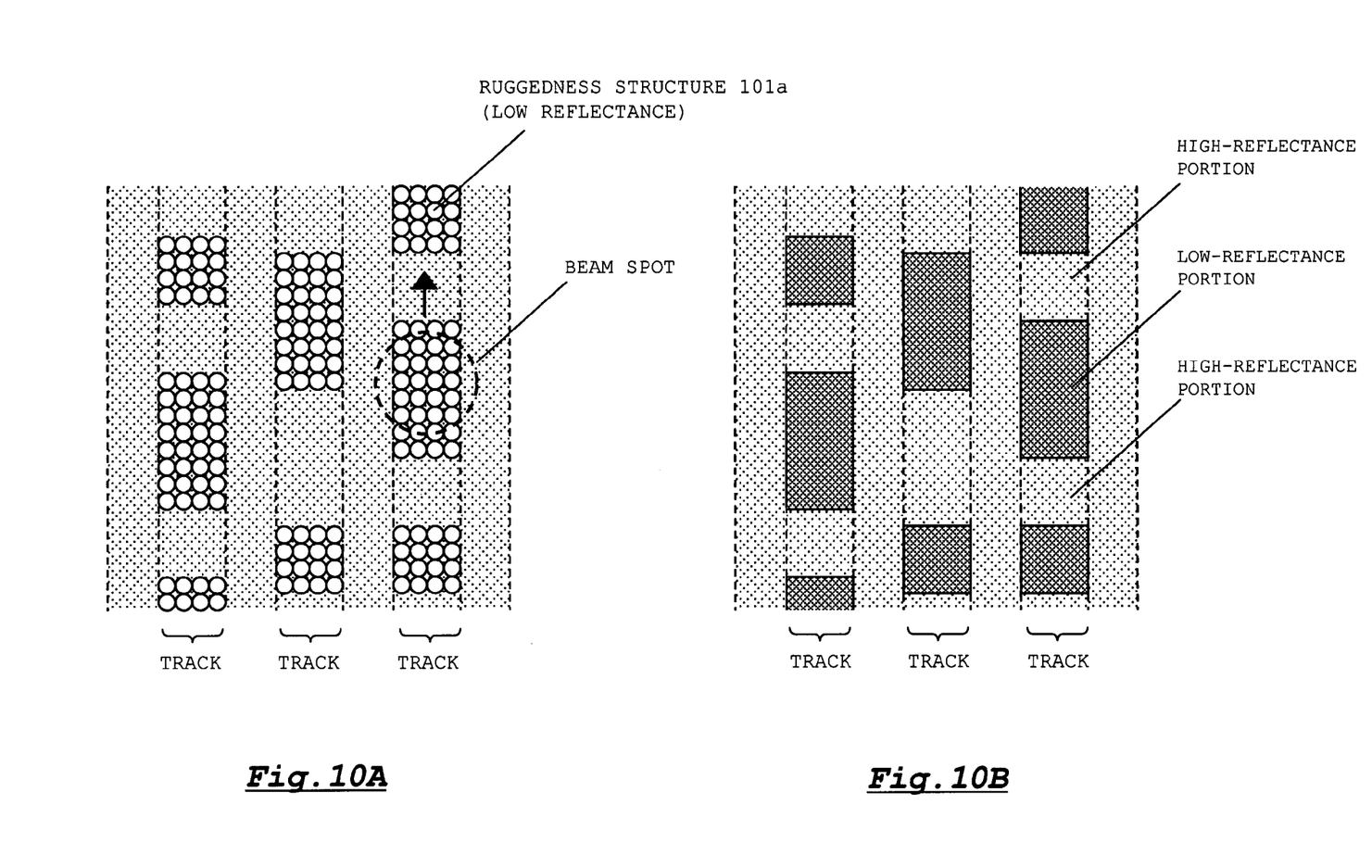
FIGS. 10A and 10B are schematic views showing a state of a track in Embodiment 2 of the present invention.

FIGS. 10A and 10B are schematic views each showing a state of a track formed in the optical disc.

As shown in FIG. 10A, each of the ruggedness structures 101a includes four columnar structures formed in a track width direction and an arbitrary number of columnar structures formed in a track length direction. The ruggedness structures 101a each having a length corresponding to a recording signal are arranged in the longitudinal direction of the track. FIG. 10B illustrates a reflectance state corresponding to the state shown in FIG. 10A. The reflectance of each of only parts in which the ruggedness structures 101a are formed is reduced. A space portion located between adjacent tracks and a space portion interposed between the adjacent ruggedness structures 101a in the track each have reflectance higher than that of the reflecting layer 102.

Therefore, as shown in FIG. 10A, when the track is scanned with laser light having power at which each of the ruggedness structures 101a is not raised and flattened while the plurality of columnar structures of each of the ruggedness structures are within the beam spot, it is possible to reproduce recording signals in the track based on changes in intensities of reflection light. At this time, for example, the beam spot can be positioned onto the track by servo systems similar to a tracking serve system and a focus servo system which are employed in a known CD player.

As described above, according to this embodiment mode, a novel type of optical recording medium using the ruggedness structures 101a can be constructed. In particular, in the case of the recordable optical disc described in Embodiment 1, the recording layer to be located can be omitted, so a disc structure and a manufacturing process therefor can be simplified. It is unnecessary to use an organic pigment material as a material of the recording layer unlike the case of a known CD-R. Therefore, an optical disc which is environmentally friendly can be constructed.

In the case of the optical disc described in Embodiment 2, when the laser power is increased, it is likely to erase recording signals. However, the limitation on the number of use of the disc, the erasure of secret data and unnecessary data, or the like can be also performed as appropriate using such characteristic. Signals are recorded using the minute ruggedness structures, so it is also possible to prevent copying such as dead copying or substrate surface transfer.

In this embodiment, Al, a combination of Al and other alloys, or the like is used for the reflecting layer. However, the present invention is not limited to those. A metal or an alloy thereof which has predetermined reflectance can be used as the material of the reflecting layer. Reflectance is normally specified based on the specification of each disc and the predetermined reflectance described here is reflectance required according to the specification of each disc. In this time, reflectance may be reduced using the ruggedness structure as described in this embodiment to suitably adjust a reflectance difference.

Figure 11:
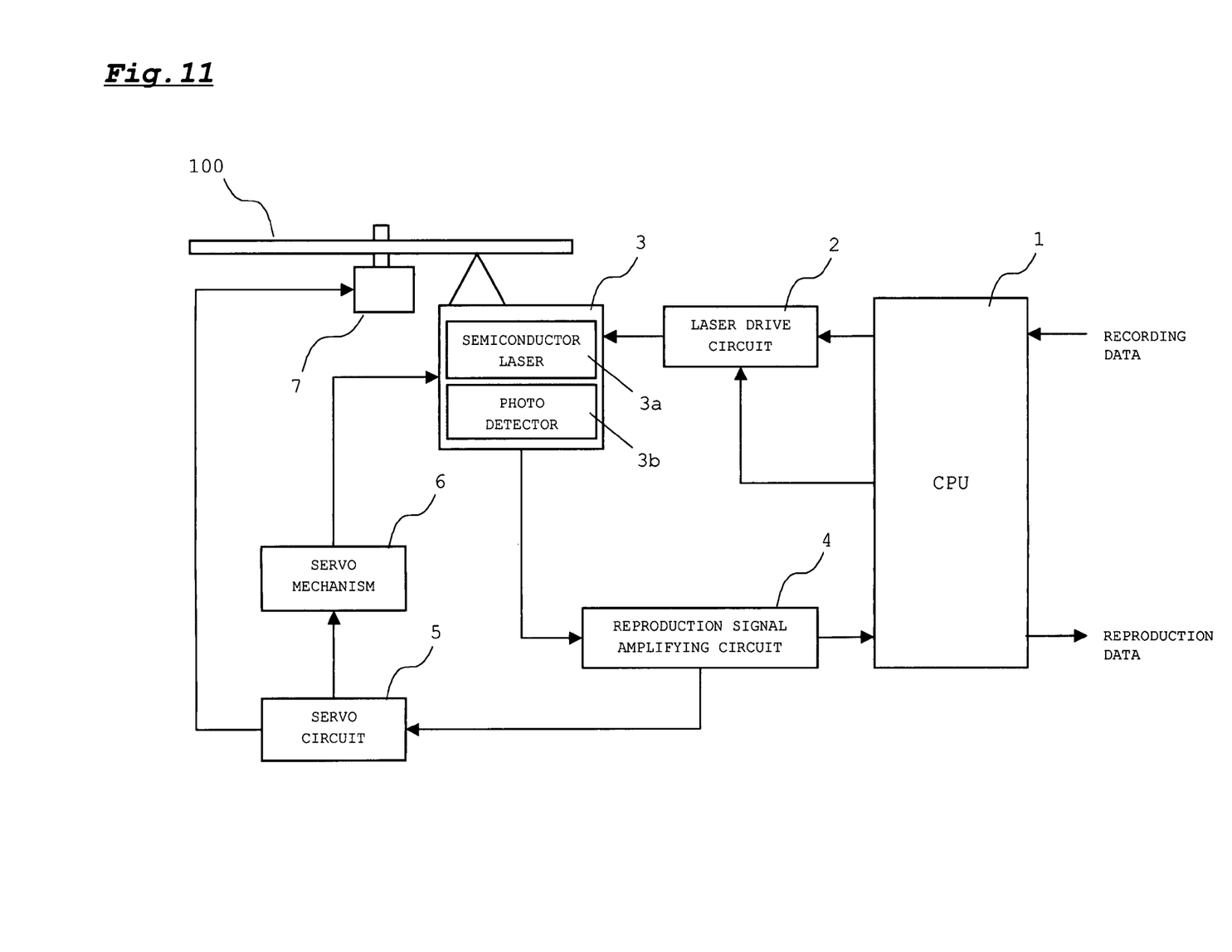
FIG. 11 is a structural diagram showing a recording and reproducing apparatus according to the embodiment mode of the present invention.

FIG. 11 illustrates a fundamental structure of a recording and reproducing apparatus for recording and reproducing information in and from the optical disc described in any one of Embodiments 1 and 2.

In FIG. 11, the recording and reproducing apparatus includes a central processing unit (CPU) 1, a laser drive circuit 2, an optical pickup 3, a reproduction signal amplifying circuit 4, a servo circuit 5, a servo mechanism 6, and a spindle motor 7. The laser drive circuit 2 drives a semiconductor laser 3a according to an instruction from the CPU 1. The reproduction signal amplifying circuit 4 operates or amplifies a signal from a photo detector 3b disposed in the optical pickup 3 and outputs various signals to corresponding circuits. The servo circuit 5 generates servo signals based on a focus error signal, a tracking error signal, and a synchronization signal, which are supplied from the reproduction signal amplifying circuit 4, and supplies the servo signals to the servo mechanism 6 and the spindle motor 7. The servo mechanism 6 drives an objective lens disposed in the optical pickup 3 according to a focus servo signal and a tracking servo signal, which are supplied from the servo circuit 5. The spindle motor 7 rotates the optical disc at predetermined rate according to a motor servo signal supplied from the servo circuit 5.

Recording operation of the recording and reproducing apparatus is executed when the optical disc described in Embodiment 1 is set therein. Recording data is subjected to encode processing by the CPU 1 and then outputted as a recording signal to the laser drive circuit 2. The laser drive circuit 2 drives the semiconductor laser 3a disposed in the optical pickup 3 to emit a beam whose intensity is modulated in a pulse form according to the recording signal. The laser power at recording mark formation timing is set to high power capable of raising and flattening the ruggedness structure 101a.

As shown in FIG. 9A, a track is irradiated with laser light from the optical pickup 3 such that the plurality of columnar structures of the ruggedness structure 101a are simultaneously within a beam spot thereof. That is, the laser light from the semiconductor laser 3a is condensed by an objective lens provided in the optical pickup 3 such that the plurality of columnar structures of the ruggedness structure 101a are simultaneously within the beam spot thereof. The beam spot follows the track including the ruggedness structure 101a based on the rotation of the disc 100, the focus servo operation, and the tracking servo operation. Therefore, as shown in FIG. 9B, a portion, which is irradiated with a high-intensity laser light, of the ruggedness structure 101a formed in the track is raised and flattened, with the result that a recording mark is formed on the track.

Reproducing operation of the recording and reproducing apparatus is executed when the optical disc described in Embodiment 2 or the optical disc described in Embodiment 1 on which information has been recorded by the above-mentioned recording operation is set therein. The laser drive circuit 2 drives the semiconductor laser 3a disposed in the optical pickup 3 to emit a monotonic laser beam. Here, emitting laser power is set to low power at which the ruggedness structures 101a is not raised and flattened.

As shown in FIG. 9A or 10A, a track is irradiated with laser light from the optical pickup 3 such that the plurality of columnar structures of the ruggedness structure 101a are simultaneously within a beam spot thereof. The beam spot follows the track including the ruggedness structure 101a based on the rotation of the disc 100, the focus servo operation, and the tracking servo operation. Therefore, the intensity of reflection light on the optical disc is modulated by the high-reflectance portions and the low-reflectance portions as shown in FIG. 9C or 10B. That modulation is reflected on a reproduction signal from the photo detector 3b. The reproduction signal is subjected to demodulation processing by CPU 1 to obtain reproduction data.

The embodiment mode of the present invention has been described above, however, the present invention is not limited to the aforementioned embodiment mode. For example, the shape and the size of the ruggedness structure 101a, and the number of columnar structures arranged in the track width direction are not limited to those described in the embodiments and thus modifications can be made as appropriate. In addition, various modifications of the embodiment mode of the present invention can be made as appropriate without departing from the scope of the technical idea described in the claims.

What is claimed is:

1. An optical recording medium, comprising:
a substrate comprising a ruggedness structure portion and a flat portion which are alternately arranged in a surface of the substrate, the ruggedness structure portion having a plurality of projections arranged in longitudinal and lateral directions with pitches each being smaller than a wavelength of laser light used for recording and/or reproducing; and
a reflecting layer formed on the surface of the substrate in which the ruggedness structure portion is formed, wherein
information is recordable in the ruggedness structure portion.

2. An optical recording medium, comprising:
a substrate comprising a ruggedness structure portion and a flat portion which are alternately arranged in a surface of the substrate and have track shapes, respectively, the ruggedness structure portion having a plurality of projections arranged in a track length direction and a track width direction with pitches each being smaller than a wavelength of laser light used for recording; and
a reflecting layer formed on the surface of the substrate in which the ruggedness structure portion is formed, wherein
information is recordable in the ruggedness structure portion.

3. An optical recording medium, comprising:
a substrate comprising ruggedness structure portions and flat portions which are alternately arranged in a surface of the substrate in a track length direction so as to be in a track shape, the ruggedness structure portions each having a plurality of projections arranged in the track length direction and a track width direction with pitches each being smaller than a wavelength of laser light used for reproducing; and
a reflecting layer formed on the surface of the substrate in which the ruggedness structure portions are formed.

4. An optical recording medium according to claim 3, wherein the ruggedness structure portions are intermittently arranged corresponding to recording signals along the track.

5. An optical recording method of irradiating an optical recording medium with laser light to record information in the optical recording medium, the optical recording medium including: a substrate comprising a ruggedness structure portion and a flat portion which are alternately arranged in a surface of the substrate, the ruggedness structure portion having a plurality of projections arranged in longitudinal and lateral direction with pitches each being smaller than a wavelength of the laser light; and a reflecting layer formed on the surface of the substrate in which the ruggedness structure portion is formed, the optical recording method comprising:
irradiating the optical recording medium with the laser light such that a plurality of projections of the ruggedness structure portion are within a beam spot of the laser light; and
setting power of the laser light at a recording mark formation timing to power in which the shape of the irradiated projections in the ruggedness structure portions can be changed while the optical recording medium is irradiated with the laser light.

6. An optical recording method according to claim 5, wherein the laser light includes intensity modulated in a pulse form based on a recording signal.

7. An optical recording method of irradiating an optical recording medium with laser light to record information in the optical recording medium, the optical recording medium including: a substrate comprising a ruggedness structure portion and a flat portion which are alternately arranged in a surface of the substrate, the ruggedness structure portion having a plurality of projections arranged with predetermined pitches in longitudinal and lateral directions; and a reflecting layer formed on the surface of the substrate in which the ruggedness structure portion is formed, the optical recording method comprising:
irradiating the optical recording medium with the laser light such that a plurality of projections of the ruggedness structure portion are within a beam spot of the laser light; and
setting power of the laser light at a recording mark formation timing to power in which the shape of the irradiated projections in the ruggedness structure portion can be changed while the optical recording medium is irradiated with the laser light.

8. An optical recording method according to claim 7, wherein the laser light includes intensity modulated in a pulse form based on a recording signal.

9. An optical reproducing method of irradiating an optical recording medium with laser light to reproduce information from the optical recording medium, the optical recording medium including: a substrate comprising ruggedness structure portions and flat portions which are alternately arranged in a surface of the substrate in a track length direction so as to be in a track shape, the ruggedness structure portions each having a plurality of projections arranged in the track length direction and a track width direction with pitches each being smaller than a wavelength of the laser light; and a reflecting layer formed on the surface of the substrate in which the ruggedness structure portions are formed, the optical reproducing method comprising:
causing the laser light to follow the track; and
irradiating the optical recording medium with the laser light at power in which shapes of irradiated projections in the ruggedness structure portions can not be changed while a plurality of projections of the ruggedness structure are within a beam spot of the laser light.

10. An optical reproducing method of irradiating an optical recording medium with laser light to reproduce information therefrom, the optical recording medium including: a substrate comprising ruggedness structure portions and flat portions which are alternately arranged in a surface of the substrate in a track length direction so as to be in a track shape, the ruggedness structure portions each having a plurality of projections arranged with predetermined pitches in the track length direction and a track width direction; and a reflecting layer formed on the surface of the substrate in which the ruggedness structure portions are formed, the optical reproducing method comprising:

causing the laser light to follow the track; and irradiating the optical recording medium with the laser light at power in which shapes of irradiated projections in the ruggedness structure portions can not be changed while a plurality of projections of the ruggedness structure are within a beam spot of the laser light.

11. An optical recording apparatus for irradiating an optical recording medium with laser light to record information in the optical recording medium, the optical recording medium including: a substrate comprising a ruggedness structure portion and a flat portion which are alternately arranged in a surface of the substrate, the ruggedness structure portion having a plurality of projections arranged in longitudinal and lateral directions with pitches each being smaller than a wavelength of the laser light; and a reflecting layer formed on the surface of the substrate in which the ruggedness structure portion is formed, the optical recording apparatus comprising:

laser irradiation means for condensing the laser light and irradiating the optical recording medium with the laser light such that a plurality of projections of the ruggedness structure portion is within a beam spot of the laser light; and power setting means for setting power of the laser light at a recording mark formation timing to power by which the shape of the irradiated projections in the ruggedness structure portion can be changed while the optical recording medium is irradiated with the laser light.

12. An optical recording apparatus according to claim 11, wherein the laser irradiation means modulates an intensity of the laser light in a pulse form based on a recording signal.

13. An optical recording apparatus for irradiating an optical recording medium with laser light to record information in the optical recording medium, the optical recording medium including: a substrate comprising a ruggedness structure portion and a flat portion which are alternately arranged in a surface of the substrate, the ruggedness structure portion having a plurality of projections arranged with predetermined pitches in longitudinal and lateral directions being formed in the surface thereof; and a reflecting layer formed on the surface of the substrate in which the ruggedness structure portion is formed, the optical recording apparatus comprising:

laser irradiation means for condensing the laser light and irradiating the optical recording medium with the laser light such that a plurality of projections of the ruggedness structure portion are within a beam spot of the laser light; and power setting means for setting power of the laser light at a recording mark formation timing to power by which shapes of the irradiated projections in the ruggedness structure portion can be changed while the optical recording medium is irradiated with the laser light.

14. An optical recording apparatus according to claim 13, wherein the laser irradiation means modulates an intensity of the laser light in a pulse form based on a recording signal.

15. An optical reproducing apparatus for irradiating an optical recording medium with laser light to reproduce information from the optical recording medium, the optical recording medium including: a substrate comprising ruggedness structure portions and flat portions which are alternately arranged in a surface of the substrate in a track length direction so as to be in a track shape, the ruggedness structure portions each having a plurality of projections arranged in the track length direction and a track width direction with pitches each being smaller than a wavelength of the laser light; and a reflecting layer formed on the surface of the substrate in which the ruggedness structure portions are formed, the optical reproducing apparatus comprising:

laser irradiation means for condensing the laser light and irradiating the optical recording medium with the laser light such that a plurality of projections of the respective ruggedness structure are within a beam spot of the laser light while the laser light follows the track; and power setting means for setting power of the laser light to power by which shapes of the irradiated projections in the ruggedness structure portions can not be changed while the optical recording medium is irradiated with the laser light.

16. An optical reproducing apparatus for irradiating an optical recording medium with laser light to reproduce information from the optical recording medium, the optical recording medium including: a substrate comprising ruggedness structure portions and flat portions which are alternately arranged in a surface of the substrate in a track length direction so as to be in a track shape, the ruggedness structure portions each having a plurality of projections arranged with predetermined pitches in the track length direction and a track width direction; and a reflecting layer formed on the surface of the substrate in which the ruggedness structure portions are formed, the optical reproducing apparatus comprising:

laser irradiation means for condensing the laser light and irradiating the optical recording medium with the laser light such that a plurality of projections of the respective ruggedness structure portions are within a beam spot of the laser light while the laser light follows the track; and power setting means for setting power of the laser light to power by which shapes of the irradiated projections in the ruggedness structure portions can not be changed while the optical recording medium is irradiated with the laser light.

* * * * *